Patented May 24, 1949

2,470,859

UNITED STATES PATENT OFFICE 2,470,859

NONANOIC ACID

Albert A. Pavlic, Claymont, Del., assignor to E. I. du Pont de Nemours & Company, Wilmington, Del., a corporation of Delaware No Drawing. Application February 25, 1948, Serial No. 10,939

3 Claims. (Cl. 260—540)

This invention relates to novel carboxylic acid compositions and methods for preparing the same. More particularly the invention relates to a novel highly branched nonanoic acid isomer which is virtually free of the obnoxious, rancid oil odor which characterizes other carboxylic acids of similar constitution.

The lower alkanoic acids (acetic acid, propionic acid, isobutyric acid, etc.) as well as certain higher alkanoic acids (lauric, palmitic, stearic, etc.) have been well known in the industry for many years. The alkanoic acids which are intermediate between the lower members of the series and the soap-forming fatty acids have been less readily available and, in the past, have been relatively less important from a commercial standpoint. However, these intermediate members (caproic, caprylic, pelargonic, etc.) have certain properties which are highly desirable in commercial applications; for example, their metal salts can be used as thickeners for greases, and their esters are of value as plasticizers and lubricants. No commercially feasible methods are known at the present time for the synthesis of the straight chain alkanoic acids of intermediate molecular weight. Since it has not been possible heretofore to manufacture these acids from relatively cheap starting materials by any commercially feasible process, the supply of such acids has necessarily been limited and, of course, the magnitude of the outlets for such acids has been limited in a similar way.

Certain branched chain alkanoic acids having about 8 to 10 carbon atoms per molecule have been prepared heretofore by methods which were suitable for use in small laboratory scale operations; for example, an acid having the formula $HC(CH_3)_2CH_2CH_2C(CH_3)C_2OOH$ has been known for many years (Compt. rend. 158, 304). This previously known acid has been described as having a very offensive odor resembling that of rancid butter. Other previously known acids having somewhat similar chemical structures also have this same offensive odor. Alkanoic acids having a similar molecular weight, but having a terminal tertiary butyl group, have not been prepared or described heretofore.

An object of this invention is to synthesize an alkanoic acid having about 9 carbon atoms per molecule from cheap and readily available source materials. Another object is to provide a branched chain nonanoic acid which is free of rancid odor. Another object is to provide improvements in processes for manufacturing alkanoic acids. A still further object is to provide a nonanoic acid which remains liquid at temperatures as low as —70° C. Other objects of the invention will appear hereinafter.

These objects are accomplished in accordance with the invention by preparing a nonanoic acid having the formula $$CH_3C(CH_3)_2CH_2CH(CH_3)CH_2COOH$$

by oxidation of the C$_9$ aldehyde obtainable by reaction of diisobutylene with carbon monoxide and hydrogen as described hereinafter.

The reaction of diisobutylene with carbon monoxide and hydrogen is disclosed in the copending application Serial No. 598,208, filed June 7, 1945, now Patent No. 2,437,600, and in the copending application Serial No. 758,477, filed July 1, 1947. As disclosed in application Serial No. 758,477, it has been discovered that the aldehyde which is formed in the said process is 3,5,5-trimethylhexanal, $CH_3C(CH_3)_2CH=C(CH_3)_2$ and/or $$(CH_3)_3.C.CH_2.C(CH_3)=CH_2 + CO + H_2 \longrightarrow$$
diisobutylene
$$(CH_3)_3.C.CH_2.CH.(CH_3).CH_2.CHO$$
3,5,5-trimethylhexanal This reaction takes place preferably at superatmospheric pressures in the presence of a cobalt-containing catalyst.

It has been discovered in accordance with this invention that 3,5,5-trimethylhexanal reacts very rapidly with atmospheric oxygen, or molecular oxygen in other forms, even at ordinary temperatures; for example, if a sample of cloth is soaked in 3,5,5-trimethylhexanal and thereafter exposed to the air, the resulting oxidation reaction which takes place spontaneously is so rapid that it causes the development of considerable heat. The oxidation of 3,5,5-trimethylhexanal can be controlled, however, and this is accomplished, in the practice of the invention, by intimately mixing oxygen with 3,5,5-trimethylhexanal at a temperature of about 0° to 100° C. and continuing the resulting oxidation until 3,5,5-trimethylhexanoic acid is obtained. It has been discovered, in accordance with the invention, that during the initial stages of the oxidation an organic peroxy compound is formed by the action of oxygen with 3,5,5-trimethylhexanal. As the reaction progresses, this organic peroxy compound gradually disappears, and a virtually quantitative yield of 3,5,5-trimethylhexanoic acid is obtained. Evidently, the reactions which takes place may be represented as follows:

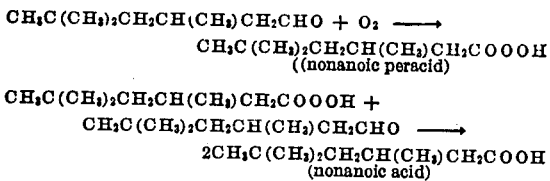

Accordingly, it is generally desirable, in the practice of the invention, to continue the oxidation at a relatively low temperature (preferably about 20° to 75° C.) until all or substantially all of the organic peroxy compound has been consumed, and a reaction product consisting substantially entirely of 3,5,5-trimethylhexanoic acid is obtained.

It is noteworthy that, in the practice of the invention, 3,5,5-trimethylhexanal can be almost quantitatively converted to 3,5,5-trimethylhexanoic acid. Virtually no oxidation of the methyl groups to carboxyl or other oxygen-containing groups occurs during the oxidation of the —CHO group to carboxyl.

It is not necessary to introduce any inert diluents into the oxidation mixture to be oxidized in the practice of the invention. The nonanoic acid which is obtained as the main, or only, oxidation product is a liquid which dissolves in the unreacted 3,5,5-trimethylhexanal, thus facilitating quantitative conversion of this aldehyde to nonanoic acid. Inorganic oxidation catalysts need not be employed in the practice of the invention and, in certain instances, it is desirable to avoid the presence of active inorganic oxidation catalysts. However, if it is desired to carry out the oxidation at the maximum rate, which may result in the formation of polycarboxylic acids along with nonanoic acid as oxidation products, oxidation catalysts such as compounds of cobalt, copper, vanadium, manganese, osmium, cerium and the like may be employed.

The invention is illustrated further by means of the following example.

*Example 1.*—112 grams of commercial diisobutylene (B. P. 100–103° C.), 75 ml. of diethyl ether (employed as a diluent), and 10 grams of reduced, fused, alkali-free cobalt catalyst are placed in a silver-lined shaker tube. A mixture of carbon monoxide and hydrogen in the mol ratio of 1:2 is introduced until the pressure is about 600 to 805 atmospheres and the reaction mixture is maintained at about 120° to 125° C. for a period of two hours. The reaction mixture, upon distillation, yields 44.1% of the colorless liquid, 3,5,5-trimethylhexanal [B. P. 170° to 171° C./760 mm.; carbonyl number (as determined by the method disclosed by Bryant and Smith, J. A. C. S., 57, 57) 383.2; theoretical carbonyl number for 3,5,5-trimethylhexanal, 394; refractive index, $n_D^{25°}=1.4188$]. A small fraction [B. P. 118° to 145° C./50 mm., $n_D^{25°}=1.4313$], which consists principally of 3,5,5-trimethylhexanol-1, is separated by distillation of the higher boiling fractions of the synthesis product. A sample of purified 3,5,5-trimethylhexanal, prepared as above described, is placed in a reaction vessel, and air is passed into the aldehyde through a sparger which permits intimate mixing of the air with the aldehyde. An exothermic oxidation reaction results. The temperature of the mixture is maintained at about 30° to 50° C., and the oxidation is continued at this temperature for a period of four days. During the early stages of the oxidation, a considerable quantity of organic peroxy compound is formed, and is shown by the fact that the reaction mixture causes a very rapid oxidation of potassium iodide to iodine when a sample of the mixture is tested for peroxide by the usual method. At the end of four days, the conversion of aldehyde to acid is virtually quantitative. The resulting liquid product, which is virtually all nonanoic acid, is distilled and is found to have a boiling point of 85° C. at 4 mm. and 103° C. at 6 mm. The redistilled acid does not crystallize when cooled to —76° C. The refractive index ($n_D^{25°\ C.}$) is 1.4268 for the distilled sample and 1.4266 for an undistilled sample. The acid is insoluble in water but soluble in methanol, acetone, benzene, toluene, absolute alcohol, cyclohexane and dioxane. The redistilled nonanoic acid has a sharp but not offensive odor.

*Example 2.*—A solution of 71 grams of 3,5,5-trimethylhexanal, 142 grams of acetic acid and 0.1 gram of manganous acetate tetrahydrate at room temperature and atmospheric pressure is blown with air through a sparger. Heat is evolved, but at the end of three hours the solution has again cooled to room temperature. Air-blowing is continued for an additional one-half hour. The products are then distilled at reduced pressure through a fractionating column. The fractions boiling in the ranges of 50° to 110° C. at 10 mm. pressure and 80° to 85° C. at 3 mm. pressure are combined, mixed with excess aqueous alkali and the non-acidic material is removed by extracting with ether. The crude 3,5,5-trimethylhexanoic acid is liberated from the alkaline solution by acidification with mineral acid, then separated and redistilled. There is obtained 56.3 grams of pure 3,5,5-trimethylhexanoic acid, B. P. 80° to 85° C. at 3 mm. pressure, having a refractive index of 1.4268 at 25° C. and an acid number of 349 (theory=354).

It is to be understood that the foregoing examples are illustrative only and that many different methods of practicing the invention will be apparent to those skilled in the art. The oxidation of 3,5,5-trimethylhexanal to 3,5,5-trimethylhexanoic acid can be accomplished by methods other than the novel oxidation process disclosed in the examples without altering, in any substantial way, the nature of the 3,5,5-trimethylhexanoic acid. Thus the invention embraces this novel nonanoic acid as prepared by any method whatever, since the said acid is a novel composition of matter.

The nonanoic acid obtained in the practice of the invention is useful in the manufacture of numerous organic reaction products such as esters thereof with monohydric or polyhydric alcohols. The polyvinyl ester of this acid is highly valuable as a thickener for both naphthenic and paraffin base lubricating oils. This acid also can be converted quite readily to metallic salts which are useful as thickeners in greases and as catalysts in organic salt-type driers. It is also of value as a modifier in alkyd resins and for numerous other applications requiring an alkanoic acid of intermediate molecular weight. In many instances, the nonanoic acid of this invention is preferable, in commercial applications, to previously known alkanoic acids, because the novel nonanoic acid is a low-melting liquid which does not freeze at temperatures as low as −70° C., or even lower, and is free of the offensive, rancid odor which characterizes the previously known branched-chain alkanoic acids of similar molecular weight.

Since many different embodiments of the invention will occur to those skilled in the art, it is to be understood that we do not limit ourselves except as set forth in the following claims.

I claim:

1. A normally liquid alkanoic acid of the formula $CH_3C(CH_3)_2CH_2CH(CH_3)CH_2COOH$.

2. A process for the preparation of 3,5,5-trimethylhexanoic acid which comprises intimately mixing molecular oxygen with 3,5,5-trimethylhexanal at a temperature of 0° to 100° C., and continuing the resulting oxidation until 3,5,5-trimethylhexanoic acid is obtained.

3. A process for the preparation of 3,5,5-trimethylhexanoic acid which comprises intimately mixing molecular oxygen with 3,5,5-trimethylhexanal at a temperature of 20° to 75° C., continuing the resulting reaction until a mixture of organic peroxy compound formed by the said reaction, and 3,5,5-trimethylhexanoic acid, is obtained, thereafter continuing the resulting reaction further until substantially all of the 3,5,5-trimethylhexanal has been converted to 3,5,5-trimethylhexanoic acid, and a liquid product consisting substantially entirely of 3,5,5-trimethylhexanoic acid is obtained.

ALBERT A. PAVLIC.

REFERENCES CITED

The following references are of record in the file of this patent:

UNITED STATES PATENTS

| Number | Name | Date |
|---|---|---|
| 2,010,358 | Groll et al. | Aug. 6, 1935 |
| 2,115,892 | Toussaint | May 3, 1938 |
| 2,417,220 | Smith et al. | Mar. 11, 1947 |
| 2,418,899 | Pevere et al. | Apr. 15, 1947 |
| 2,444,399 | Duval et al. | June 29, 1948 |